(12) United States Patent
Yoshida et al.

(10) Patent No.: US 11,795,894 B1
(45) Date of Patent: Oct. 24, 2023

(54) ENGINE INTAKE SYSTEM

(71) Applicant: Mazda Motor Corporation, Hiroshima (JP)

(72) Inventors: Ken Yoshida, Aki-gun (JP); Hiroyuki Ohmura, Hiroshima (JP); Shinsuke Fujita, Hiroshima (JP); Takuya Yamada, Hiroshima (JP); Shintaro Umesaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 18/188,702

(22) Filed: Mar. 23, 2023

(30) Foreign Application Priority Data

Apr. 1, 2022 (JP) ................. 2022-061780

(51) Int. Cl.
*F02M 35/10* (2006.01)
*F02M 35/104* (2006.01)
*F02M 35/112* (2006.01)

(52) U.S. Cl.
CPC ..... *F02M 35/112* (2013.01); *F02M 35/10111* (2013.01); *F02M 35/10354* (2013.01)

(58) Field of Classification Search
CPC ....... F02M 35/10111; F02M 35/10354; F02M 35/112
USPC ........................................ 123/184.38, 184.42
See application file for complete search history.

(56) References Cited

U.S. PATENT DOCUMENTS

| | | | | |
|---|---|---|---|---|
| 6,283,078 | B1* | 9/2001 | Munetoki | B29C 66/54 |
| | | | | 123/184.42 |
| 2002/0050261 | A1* | 5/2002 | Miyahara | F02M 35/116 |
| | | | | 123/184.61 |
| 2006/0249115 | A1* | 11/2006 | Hashimoto | F02M 35/10354 |
| | | | | 123/184.55 |
| 2018/0372039 | A1* | 12/2018 | Sakurai | F02M 35/10052 |

FOREIGN PATENT DOCUMENTS

JP 2016070249 A 5/2016
WO WO-2004046536 A1 * 6/2004 ....... F02M 35/10052

* cited by examiner

*Primary Examiner* — Erick R Solis
(74) *Attorney, Agent, or Firm* — Alleman Hall Creasman & Tuttle LLP

(57) ABSTRACT

An intake system of an engine including an intake manifold, which includes an intake air introducing pipe and a plurality of independent intake pipes, is provided. Each of the independent intake pipes has an arc shape surrounding the intake air introducing pipe from outside with a space. A first independent intake pipe is curved more in the cylinder lined-up direction than a second. From the side in the cylinder lined-up direction, the arc shape of the second independent intake pipe is more distant from the intake air introducing pipe. To a first member constituting part of the intake air introducing pipe, a second member is joined to form the arc shape of the first independent intake pipe. A third member disposed radially outward from the first member is joined to the second member to form the arc shape of the second independent intake pipe.

15 Claims, 8 Drawing Sheets

ENGINE INTAKE SYSTEM

TECHNICAL FIELD

The present disclosure relates to an intake system of an engine, and especially to a structure of an intake manifold.

BACKGROUND OF THE DISCLOSURE

In vehicles, such as automobiles, an intake manifold is attached to an engine. JP2016-070249A discloses an intake manifold attached to the four-cylinder engine.

The intake manifold disclosed in JP2016-070249A includes an intake air introducing pipe which extends in the cylinder lined-up direction of the engine, a surge tank connected to one end of the intake air introducing pipe, and a plurality of independent intake pipes which are each connected at one end to the surge tank and are connected at the other end to an intake port of the engine. The intake air introducing pipe, the surge tank, and the plurality of independent intake pipes are formed integrally. The plurality of independent intake pipes are each formed in an arc shape so as to radially outwardly surround the intake air introducing pipe, which is opposite from the engine, with a space therebetween.

This intake manifold is comprised of three members which are joined to each other in the intake-and-exhaust direction of the engine. Thus, by configuring the joining of the plurality of members, a production of the intake manifold having the complicated-shaped interior space becomes easier.

Note that as for the plurality of independent intake pipes of the intake manifold, a peripheral wall part of the arc shape described above is formed by the joining of a center member which is disposed at the center among the three members, and a cover member which is disposed at a location most distant from the engine.

Meanwhile, various components (auxiliary equipment) are disposed on the side of the engine where the intake manifold is attached. When the above-described component is disposed at a position near the intake manifold, in order to avoid interference with the component, the independent intake pipe(s) at a position nearest the component among the plurality of independent intake pipes may be necessary to be curved in the cylinder lined-up direction of the engine. Further, when some of the independent intake pipes are curved as described above, in order to make the intake passage length of some of the independent intake pipes and the remaining independent intake pipes the same as possible to equalize passage resistances of air introduced into the intake port, the remaining independent intake pipes need to be disposed farther outward in the radial direction of the intake air introducing pipe from the intake air introducing pipe than the others of the independent intake pipes, in the intake-and-exhaust direction of the engine.

However, in the case disclosed in JP2016-070249A which constitutes the intake manifold with the joining of the plurality of members, if the remaining independent intake pipes are intended to be formed so as to separate from the intake air introducing pipe, it becomes necessary to increase the thickness of the part which constitutes the peripheral wall part of the remaining independent intake pipes in the center member. When trying to increase the thickness of the above-described part in the center member, it becomes easier to cause a deformation of the center member (warping, etc.), and therefore, it may cause a new problem in which the joining to the cover member becomes difficult.

SUMMARY OF THE DISCLOSURE

The present disclosure is made in view of solving the above problems, and one purpose thereof is to provide an intake system of an engine provided with an intake manifold which is easier to produce by joining together a plurality of members, and in which pipe lengths of a plurality of independent intake pipes are the same, even when a layout in which some of the independent intake pipes are curved in a cylinder lined-up direction of the engine is adopted.

An intake system of an engine according to one aspect of the present disclosure includes an intake manifold, attached to a cylinder head of the engine and formed by joining a plurality of members. The intake manifold includes an intake air introducing pipe and a plurality of independent intake pipes. The intake air introducing pipe has a tubular passage and is configured to introduce fresh air. The plurality of independent intake pipes each have a tubular passage, are attached to the cylinder head of the engine, and are configured to guide the fresh air to respective intake ports formed in the cylinder head.

In the intake system of the engine according to this aspect, the intake air introducing pipe is formed so as to extend in a cylinder lined-up direction of the engine. Each of the plurality of independent intake pipes is formed in an arc shape so as to surround the intake air introducing pipe from outside, with a space from a peripheral surface of the intake air introducing pipe opposite from the engine. When the intake manifold is seen from the front in an intake-and-exhaust direction of the engine, among the plurality of independent intake pipes, a first independent intake pipe located at one end in the cylinder lined-up direction is curved more in the cylinder lined-up direction than a second independent intake pipe different from the first independent intake pipe. When the intake manifold is seen from the side in the cylinder lined-up direction, the arc shape of the second independent intake pipe is more distant from the intake air introducing pipe than the first independent intake pipe is.

Further, in the intake system of the engine according to this aspect, the plurality of members constituting the intake manifold includes a first member, a second member, and a third member. The first member constitutes a part of a peripheral wall of the intake air introducing pipe. The second member is joined to the first member radially outward of the intake air introducing pipe, and joining of the first and second members forms the arc shape of the first independent intake pipe. The third member is disposed radially outward, with reference to the intake air introducing pipe, of the first member with a cap therebetween, and joining of the second and third members forms the arc shape of the second independent intake pipe.

According to this configuration, while the arc shape of the first independent intake pipe is formed by joining the first member to the second member, the arc shape of the second independent intake pipe is formed by joining the third member to the second member. Thus, the arc shape of the second independent intake pipe can be formed so that it is separated from the intake air introducing pipe more than the first independent intake pipe is, without increasing the thickness of the first member. Therefore, by making the first independent intake pipe be curved in the cylinder lined-up direction, and disposing the arc shape of the second independent intake pipe so as to be separated greatly from the intake air introducing pipe and radially surround the intake air introducing pipe, it can suppress the deformation, such as warping, during production of the first member, while making the pipe length the same as the first independent intake pipe.

In the intake system of the engine according to the above-described aspect, the intake air introducing pipe may have an opening at one-end side in the cylinder lined-up direction, configured to take in fresh air. The first independent intake pipe may be, among the plurality of independent intake pipes, disposed opposite in the cylinder lined-up direction from the side where the opening of the intake air introducing pipe is formed. The first member may have a first wall part constituting part of the intake air introducing pipe, and a second wall part, constituting part of the first independent intake pipe, and located on an intake air introducing pipe side with respect to the third member. The first wall part and the second wall part may be formed so that mutually-opposite wall surfaces are parallel to each other, or so that a separation between the mutually-opposite wall surfaces increases from the one-end side toward the opposite side in the cylinder lined-up direction.

According to this configuration, the first wall part and the second wall part of the first member are formed so that the mutually-opposite wall surfaces are parallel to each other, or a separation therebetween increases from the one-end side toward the opposite side in the cylinder lined-up direction. Thus, when the first member is formed using divided molds, the molds for constituting the mutually-opposite wall surfaces can be opened to the opposite side described above. Therefore, in the intake system of the above-described aspect, the first member among the plurality of members which constitute the intake manifold can be formed appropriately.

In the intake system of the engine according to the above-described aspect, the first independent intake pipe may be curved so that a lower part of the engine in a cylinder axis direction is located further toward the one-end side in the cylinder lined-up direction than an upper part is. Another component different from the intake manifold may be disposed in a part adjacent to the first independent intake pipe on the opposite side in the cylinder lined-up direction so that a part thereof is located inside the curve of the first independent intake pipe.

According to this configuration, by curving the first independent intake pipe of the intake manifold in the cylinder lined-up direction, it is possible to reduce the useless space inside the engine bay, while keeping the first independent intake pipe from interfering with the other component which is disposed in proximity to the first independent intake pipe. Further, in this configuration, it can suppress the variation in the passage resistance of fresh air toward the intake port of the engine by avoiding the interference with the other component, and equalizing the pipe lengths of the first independent intake pipe and the second independent intake pipe.

In the intake system of the engine according to the above-described aspect, the intake manifold may further include a surge tank to which the intake air introducing pipe and the plurality of independent intake pipes are joined. The plurality of members may constitute the intake manifold further including a fourth member, joined to the first member from the engine side, joining of the fourth member and the first member forming the surge tank and the intake air introducing pipe.

According to this configuration, since the intake air introducing pipe and the surge tank can be formed by joining the first member to the fourth member, it can reduce the number of members which constitute the intake manifold.

In the intake system of the engine according to the above-described aspect, the first member, the second member, the third member, and the fourth member each may be made of resin.

According to this configuration, since each of the first to fourth members which constitute the intake manifold is made of resin, the production is easier than in the case where it is made of metal, and it can suppress the increase in the weight. Further, as described above, since the arc shape of the second independent intake pipe is configured using the third member which is different from the first member, it can suppress the deformation, such as warping, when manufacturing the first member, and therefore, it can be manufactured easily.

In the intake system of the engine according to the above-described aspect, the remaining independent intake pipes among the plurality of independent intake pipes other than the first independent intake pipe each may form the respective arc shape by joining the first member to the third member. The third member may be formed integrally over all the remaining independent intake pipes.

According to this configuration, since all the remaining independent intake pipes other than the first independent intake pipe among the plurality of independent intake pipes are formed in the arc shape by joining the first member to the third member, and the third member is formed integrally over the all remaining independent intake pipes, it can suppress the increases in the number of members constituting the intake manifold, and the management and the handling of the third member become easier.

DETAILED DESCRIPTION OF THE DISCLOSURE

Figure 1:
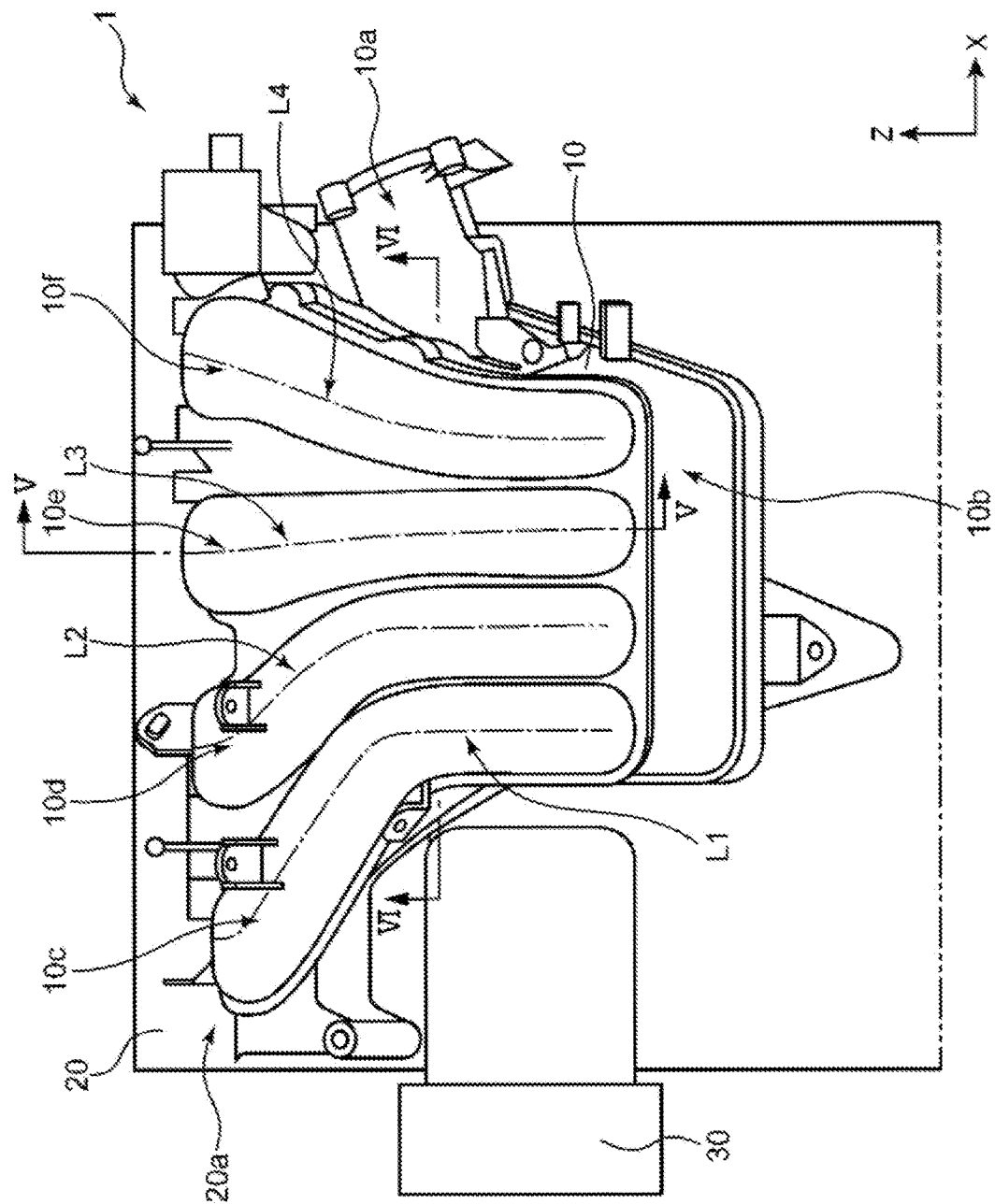
FIG. 1 is a front view illustrating a configuration of an intake system of an engine according to one embodiment.

Hereinafter, one embodiment of the present disclosure is described taking the accompanying drawings into consideration. Note that aspects explained below are examples of the present disclosure, and the present disclosure is not limited to the following aspects at all, except for the essential configuration.

Note that, in the drawings used for the following explanation, "X-direction" corresponds to "an engine cylinder lined-up direction," "Y-direction" corresponds to "an engine intake-and-exhaust direction," and "Z-direction" corresponds to "an engine cylinder axis direction."

1. Side Part Structure of Engine 20

An outline structure of one side of an engine 20 inside an engine bay is described using FIG. 1. Note that, in FIG. 1, only components (auxiliary equipment, etc.) disposed at the one side of the engine 20 are partially illustrated.

As illustrated in FIG. 1, the multi-cylinder engine 20 is mounted in the engine bay. The engine 20 is a four-cylinder engine having four cylinders formed in the X-direction. In a cylinder head 20a of the engine 20, four intake ports, each of which is connected to one of the cylinders and has an opening at the near side of FIG. 1, are formed.

In a side part of the engine 20 (a near-side side part of FIG. 1), an intake manifold 10 provided to an intake system 1, and an ISG (Integrated Starter-Generator) 30 which is another member different from the intake manifold 10, are disposed. The ISG 30 is disposed near the intake manifold 10 on the left side in the X-direction.

The intake manifold 10 is comprised of an intake air introducing pipe 10a, a surge tank 10b, and four independent intake pipes 10c-10f, which are integrally formed. The intake air introducing pipe 10a has a tubular passage therein, and is formed along an intake-side side surface of the engine 20 so as to extend in the X-direction. The intake air introducing pipe 10a has an opening on the right side in the X-direction of FIG. 1, and a throttle valve is attached to the opening.

The surge tank 10b is a part which is connected to the passage of the intake air introducing pipe 10a at a part on the left side in the X-direction, and distributes fresh air which is introduced passing through the passage inside the intake air introducing pipe 10a into the four independent intake pipes 10c-10f. To the surge tank 10b, the intake air introducing pipe 10a is joined at an upper part in the Z-direction and at a right part in the X-direction, and the four independent intake pipes 10c-10f are joined at an upper part in the Z-direction.

The four independent intake pipes 10c-10f are disposed in a state where they are lined up in the X-direction. Each of the four independent intake pipes 10c-10f has a part formed in an arc shape from a lower part in the Z-direction which is joined to the surge tank 10b so that it surrounds the intake air introducing pipe 10a and the surge tank 10b from outside, in a state where each has a space on the near side of the drawing sheet with respect to the intake air introducing pipe 10a and the surge tank 10b.

Further, the independent intake pipe (first independent intake pipe) 10c disposed on the left side in the X-direction among the four independent intake pipes 10c-10f has a curved part between the lower part in the Z-direction joined to the surge tank 10b and the upper part in the Z-direction attached to the cylinder head 20a, and a pipe axis L1 has a V-shape as illustrated in FIG. 1. This is for avoiding interference with the ISG 30 which is disposed in proximity to and forward of the intake manifold 10.

Although the independent intake pipe (second independent intake pipe) 10d located on the right side of the first independent intake pipe 10c in the X-direction has a curved part and its pipe axis L2 has a V-shape similarly to the first independent intake pipe 10c, the curvature is smaller than the first independent intake pipe 10c.

The independent intake pipe (third independent intake pipe) 10e located on the right side of the second independent intake pipe 10d in the X-direction is formed so that a pipe axis L3 extends substantially linearly. The independent intake pipe (fourth independent intake pipe) 10f located on the right side of the third independent intake pipe 10e in the X-direction is formed so that a pipe axis L4 is curved in the opposite direction from the first independent intake pipe 10c or the second independent intake pipe 10d, and it is curved more gently than the first independent intake pipe 10c and the second independent intake pipe 10d.

2. Independent Intake Pipes 10c-10f in Intake Manifold 10

Figure 2:
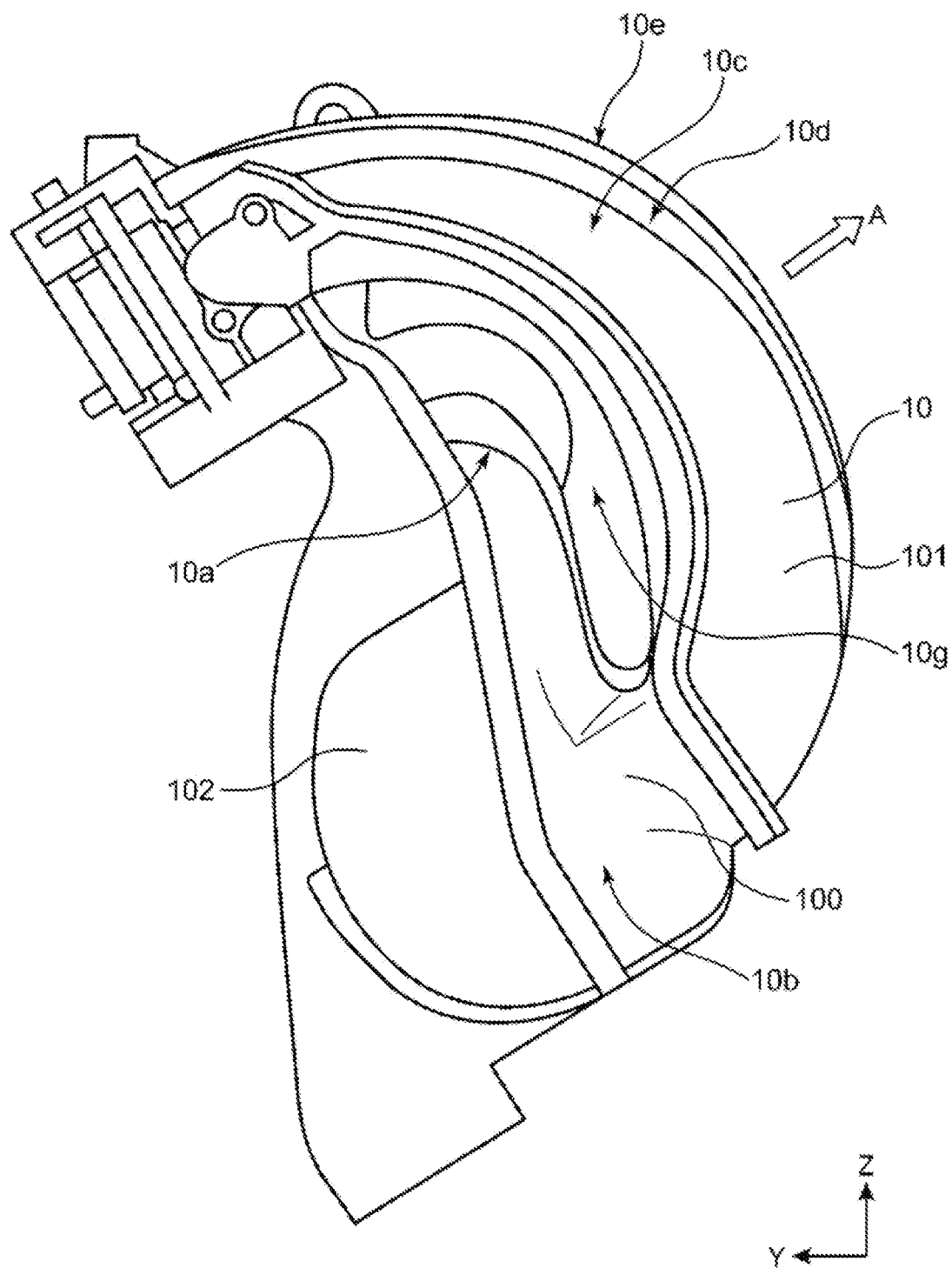
FIG. 2 is a side view illustrating a configuration of an intake manifold.

The shape of the independent intake pipes 10c-10f when the intake manifold 10 is seen in the cylinder lined-up direction of the engine 20 is described using FIG. 2. Note that in FIG. 2, illustration of the fourth independent intake pipe 10f is omitted for convenience of the illustration.

As illustrated in FIG. 2, the four independent intake pipes 10c-10f are formed so as to extend from the joined part to the surge tank 10b, upwardly in the Z-direction, with their respective arc shapes surrounding the right side of the intake air introducing pipe 10a and the surge tank 10b in the Y-direction (the opposite side from the side on which the engine 20 is disposed). As shown, the four independent intake pipes 10c-10f each arc around the intake air introducing pipe 10a. A space 10g is formed between the arc shape in each of the four independent intake pipes 10c-10f, and the intake air introducing pipe 10a and the surge tank 10b.

The outside surface of the arc of each of the second to fourth independent intake pipes 10d-10f is disposed so as to be bulged on the right side in the Y-direction (a direction illustrated by an arrow A) more greatly than the first independent intake pipe 10c. This is for equalizing the pipe lengths of the second to fourth independent intake pipes 10d-10f with the pipe length of the first independent intake pipe 10c, corresponding to the pipe axis L1 of the first independent intake pipe 10c being curved greatly in the front view, as illustrated using FIG. 1.

Note that as illustrated in FIG. 2, the third independent intake pipe 10e which is formed so that the pipe axis L3 extends substantially linearly in the front view is formed so that it is bulged greatly on the right side in the Y-direction more than the second and fourth independent intake pipes 10d and 10f of which the pipe axes L2 and L4 are curved. That is, the bulging degree of the second to fourth independent intake pipes 10d-10f on the right side in the Y-direction is defined by the curvature of the tube axes L2-L4 illustrated in FIG. 1 on the basis of the first independent intake pipe 10c.

3. Structure of Intake Manifold 10

In this embodiment, the intake manifold 10 is configured by joining four members 100-103. This structure is described using FIGS. 2 and 3.

As illustrated in FIG. 2, the intake manifold 10 forms its outer shell by joining a center member (first member) 100, an outside cover member (second member) 101, and a base member (fourth member) 102 in the Y-direction.

The base member 102 is joined to the center member 100 from the left side in the Y-direction to constitute the intake air introducing pipe 10a and the surge tank 10b. The outside cover member 101 is joined to the right side of the center member 100 in Y-direction. The outside cover member 101 constitutes an outside wall part of the arc of the four independent intake pipes 10c-10f.

Figure 3:
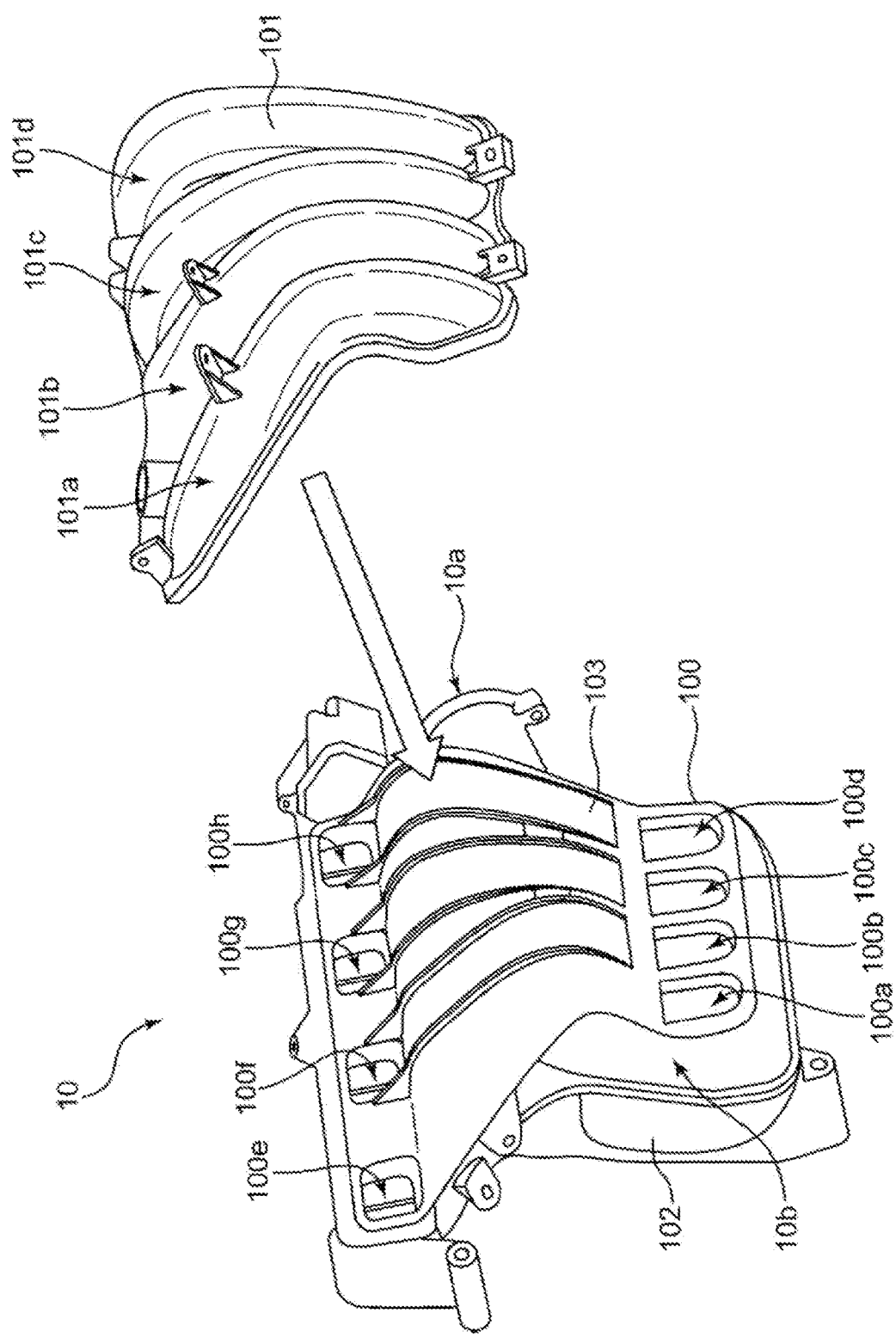
FIG. 3 is an exploded perspective view illustrating an internal configuration of the intake manifold.

As illustrated in FIG. 3, the center member 100 has four openings 100a-100d in a lower part thereof. These openings 100a-100d are openings (introductory openings) for communicating the interior space of the surge tank 10b with the piping of the independent intake pipes 10c-10f (tubular passage).

Further, the center member 100 has openings 100e-100h in an upper part thereof. These openings 100e-100h are openings (derivation openings) for communicating the piping of the independent intake pipes 10c-10f with the intake port of the cylinder head 20a, when the intake manifold 10 is attached to the cylinder head 20a.

As illustrated in FIG. 3, an inside cover member (third member) 103 is inserted between the center member 100 and the outside cover member 101. The inside cover member 103 is inserted in the part which constitutes the second to fourth independent intake pipes 10d-10f.

The first independent intake pipe 10c of the intake manifold 10 is formed by joining a first outside cover part 101a of the outside cover member 101 and the part of the center member 100 where the inside cover member 103 is not inserted.

On the other hand, the second to fourth independent intake pipes 10d-10f are formed by joining each of the second to fourth outside cover parts 101b-101d of the outside cover member 101 and the inside cover member 103.

Note that in this embodiment, the members 100-103 are made of resin, and they are joined to each other by welding.

4. Detailed Structure of Inside Cover Member 103

Figure 4:
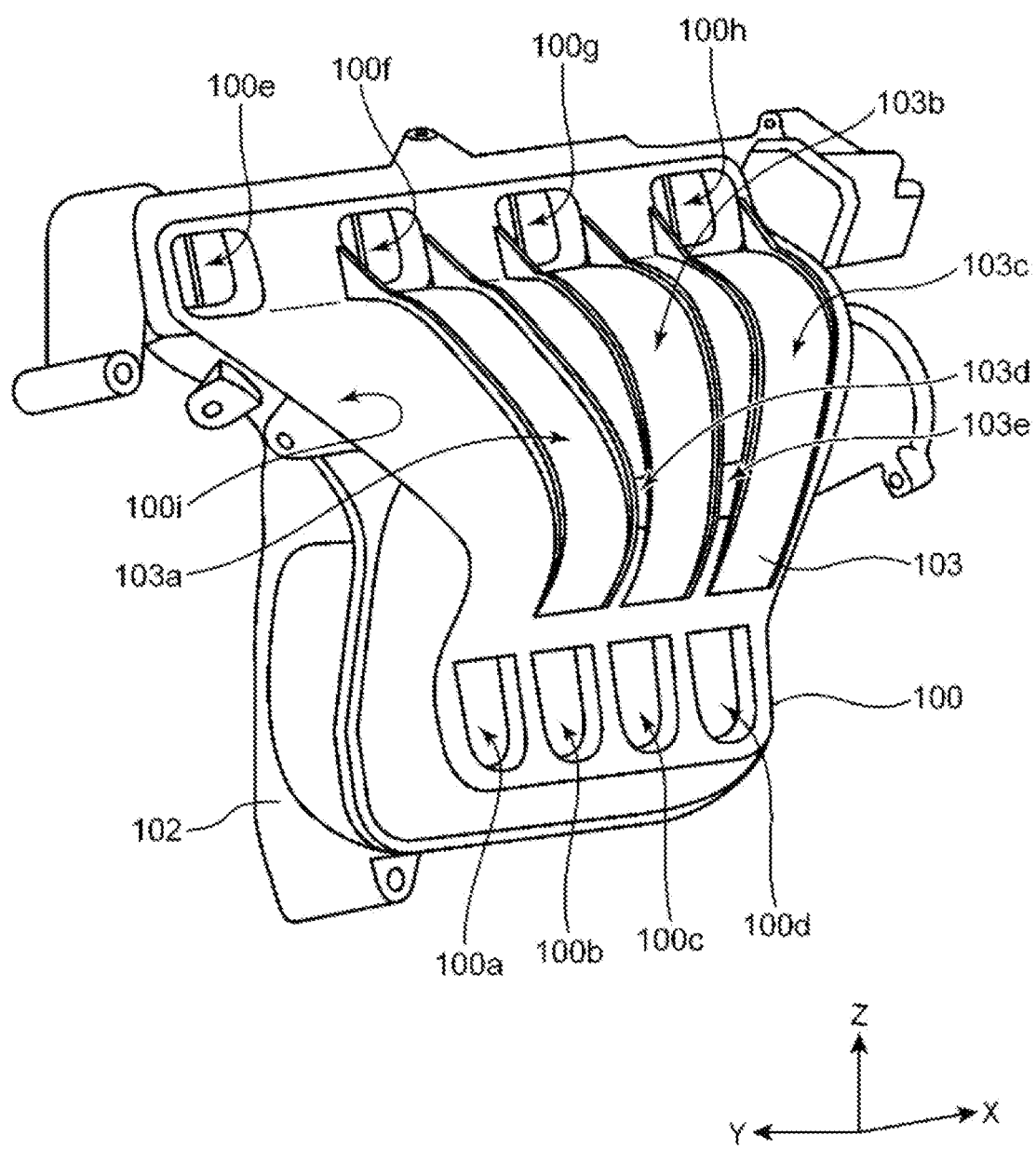
FIG. 4 is a perspective view illustrating a configuration of a center member and an inside cover member.

The detailed structure of the inside cover member 103 is described using FIG. 4.

As illustrated in FIG. 4, the inside cover member 103 has a second inside cover part 103a, a third inside cover part 103b, a fourth inside cover part 103c, and connecting parts 103d and 103e, which are formed integrally. The inside cover member 103 is disposed in a part (the part which constitutes the second to fourth independent intake pipes 10d-10f) of a wall part 100i of the center member 100 which faces the outside cover member 101.

The second inside cover part 103a constitutes a peripheral wall of the second independent intake pipe 10d by joining to the second outside cover part 101b of the outside cover member 101. The third inside cover part 103b constitutes a peripheral wall of the third independent intake pipe 10e by joining to the third outside cover part 101c of the outside cover member 101. The #4 inside cover part 103c constitutes a peripheral wall of the fourth independent intake pipe 10f by joining to the fourth outside cover part 101d of the outside cover member 101.

The connecting part 103d is located between the openings 100b and 100c and between the openings 100f and 100g, and connects the second inside cover part 103a to the third inside cover part 103b at a location near the openings 100b and 100c. The connecting part 103e is located between the openings 100c and 100d and between the openings 100g and 100h, and connects the third inside cover part 103b to the fourth inside cover part 103c at a location near the openings 100c and 100d.

5. Detailed Structure of Second to Fourth Independent Intake Pipes 10d-10f

Figure 5:
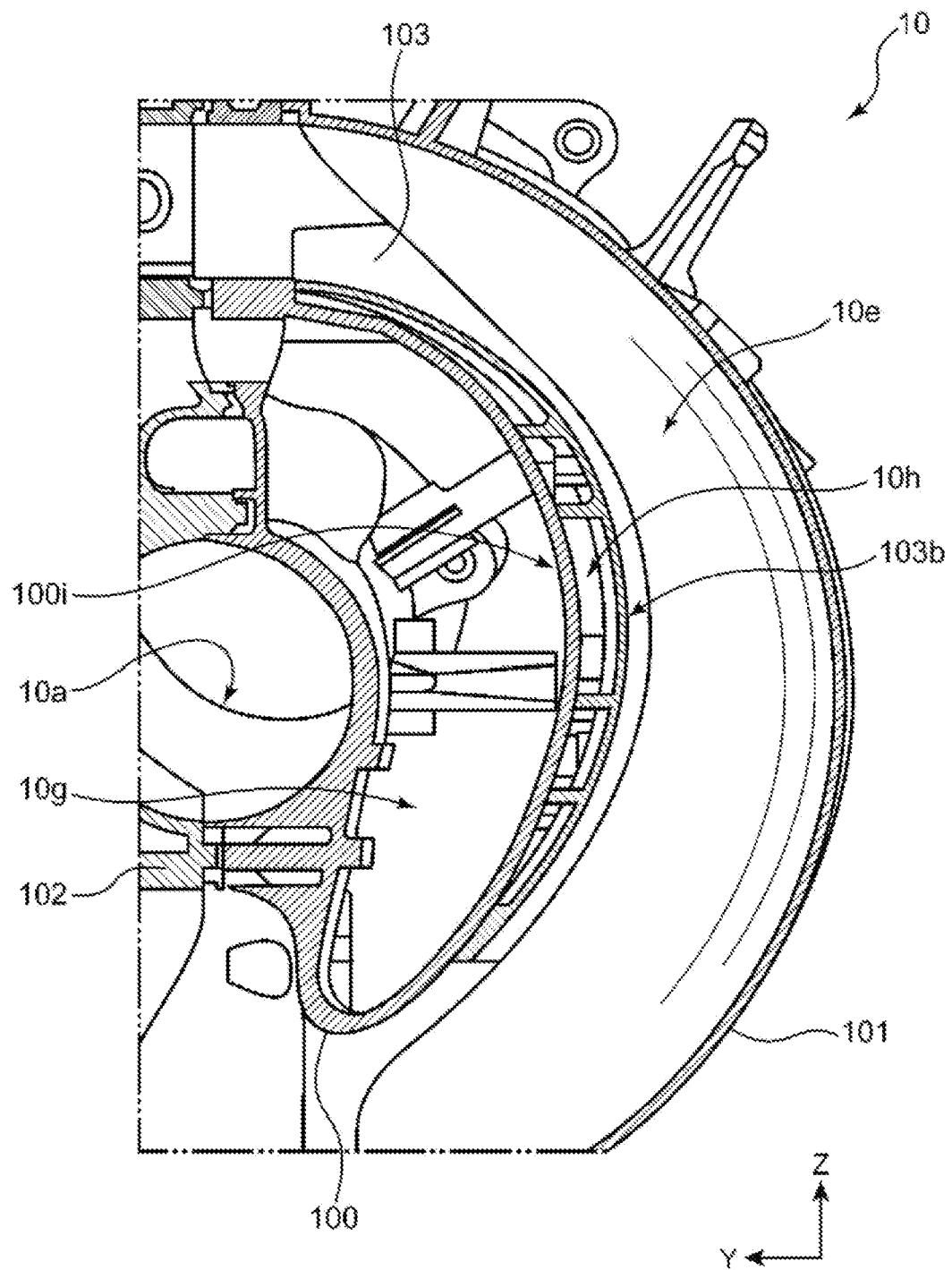
FIG. 5 is a cross-sectional view illustrating a partial configuration of a cross section taken along a line V-V of FIG. 1.
Figure 6:
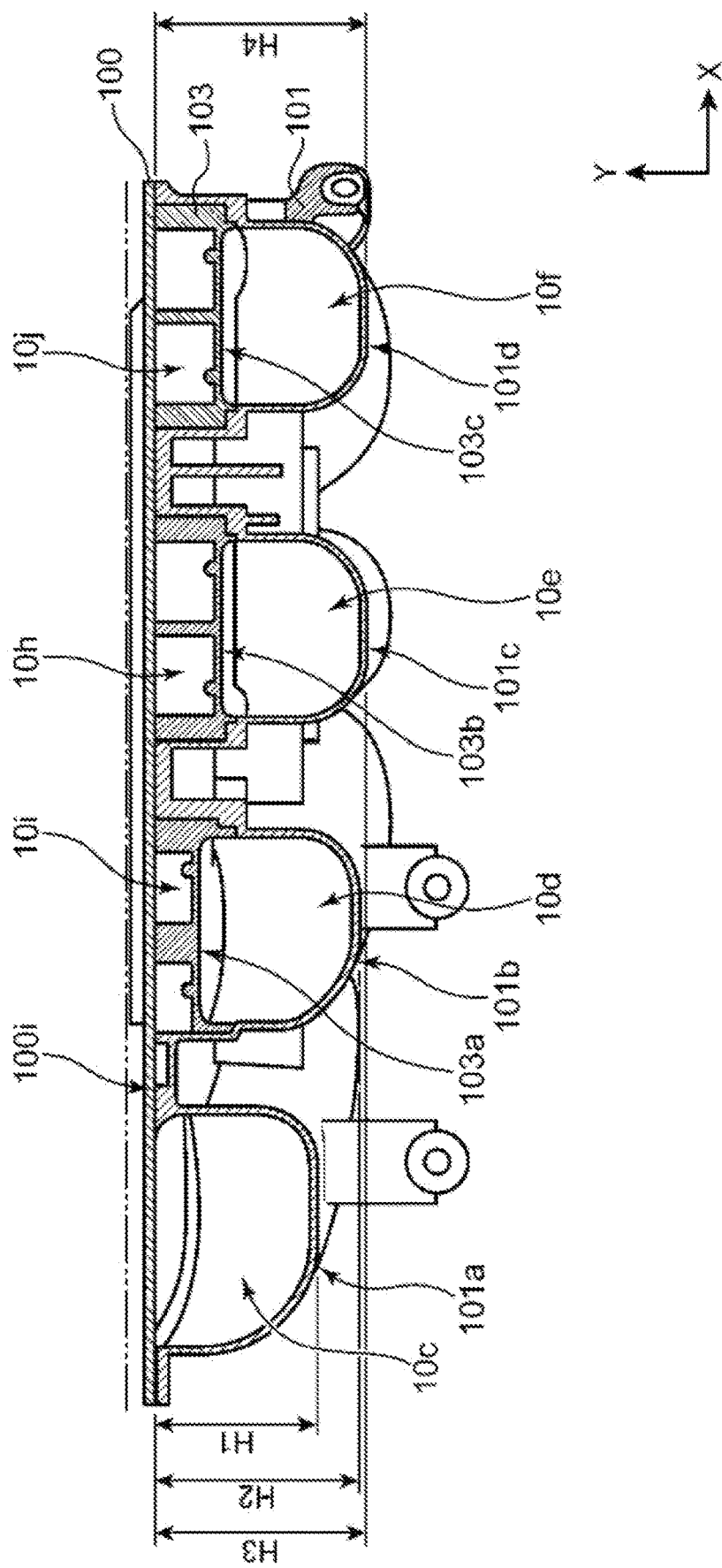
FIG. 6 is a cross-sectional view illustrating a partial configuration of a cross section taken along a line VI-VI of FIG. 1.

The detailed structure of the second to fourth independent intake pipes 10d-10f is described using FIGS. 5 and 6. Note that although in FIG. 5 only the third independent intake pipe 10e among the second to fourth independent intake pipes 10d-10f is illustrated, the fundamental structure is the same for the second and fourth independent intake pipes 10d and 10f.

As illustrated in FIG. 5, the third independent intake pipe 10e is disposed so that it surrounds the intake air introducing pipe 10a from radially outside with the space 10g therebetween. Further, a gap 10h is formed between the third inside cover part 103b of the inside cover member 103 which constitutes a part of the peripheral wall of the third independent intake pipe 10e and the wall part 100i of the center member 100. As illustrated in FIG. 6, gaps 10i and 10j are also formed between the second inside cover part 103a and the fourth inside cover part 103c which constitute the second and fourth independent intake pipes 10d and 10f, and the wall part 100i of the center member 100, respectively.

As illustrated in FIG. 6, the wall part 100i of the center member 100 has the plate thickness substantially the same from the part which constitutes a part of the peripheral wall of the first independent intake pipe 10c in the X-direction to the part located inside the fourth independent intake pipe 10f. The surface of the wall part 100i opposite from the side where the outside cover member 101 is joined is formed in a flat surface without irregularity.

The second to fourth independent intake pipes 10d-10f in which the inside cover parts 103a, 103b, and 103c of the inside cover member 103 each form a part of its peripheral wall are configured so that pipe heights H2, H3, and H4 in the Y-direction on the basis of the principal surface of the wall part 100i of the center member 100 become higher than a pipe height H1 of the first independent intake pipe 10c. Further, the gaps 10h-10j are set according to the pipe heights H2-H4 of the second to fourth independent intake pipes 10d-10f, respectively.

6. Die-Cutting Direction During Production and Detailed Structure of Center Member 100

As described above, the center member 100 is made of resin. The center member 100 is formed by filling resin in a cavity which is formed by assembling a plurality of divided molds. The die-cutting direction during production of the center member 100, and the detailed structure of the center member 100 are described using FIGS. 7 and 8.

Figure 7:
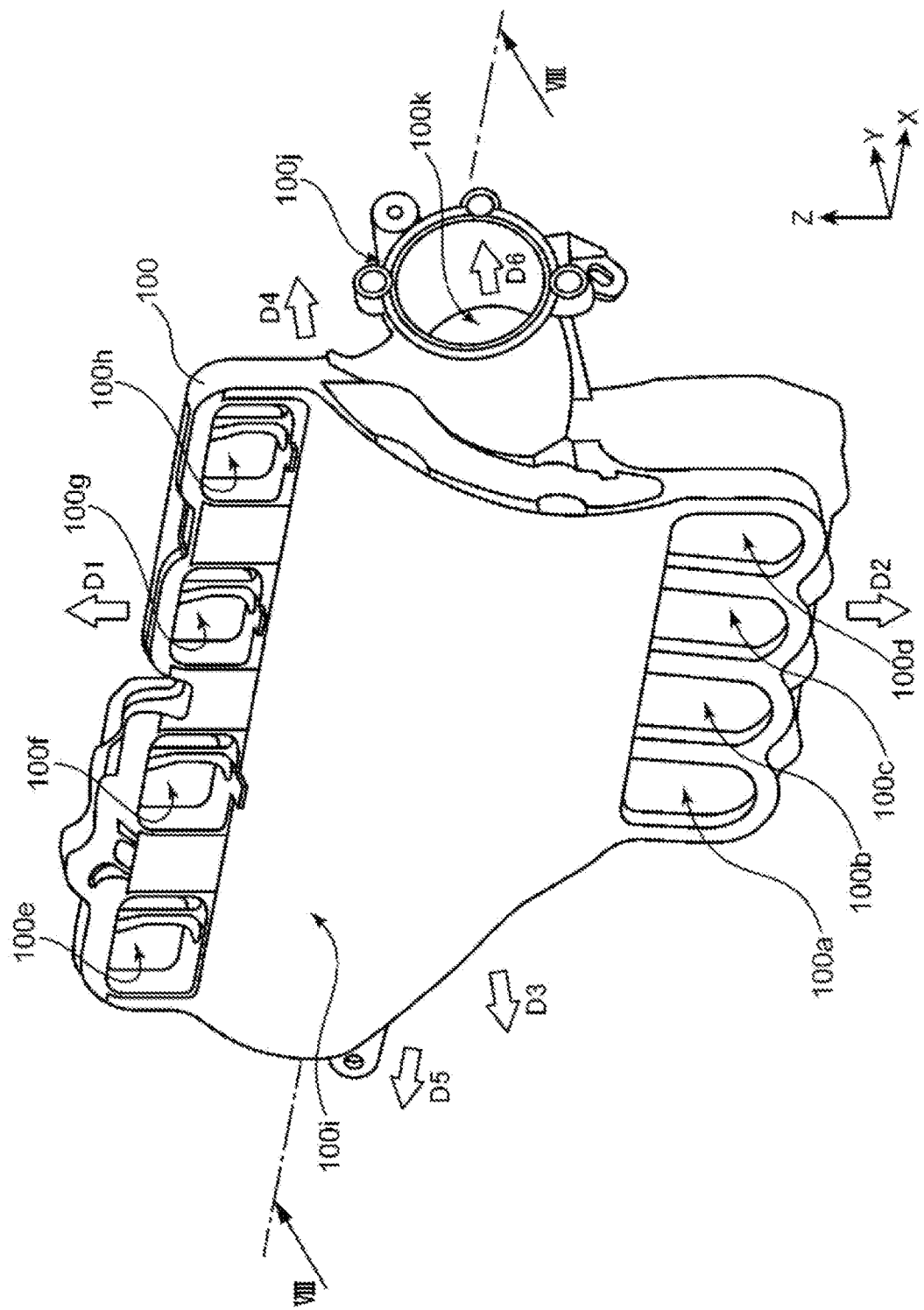
FIG. 7 is a perspective view illustrating a die-cutting direction during production of the center member.
Figure 8:
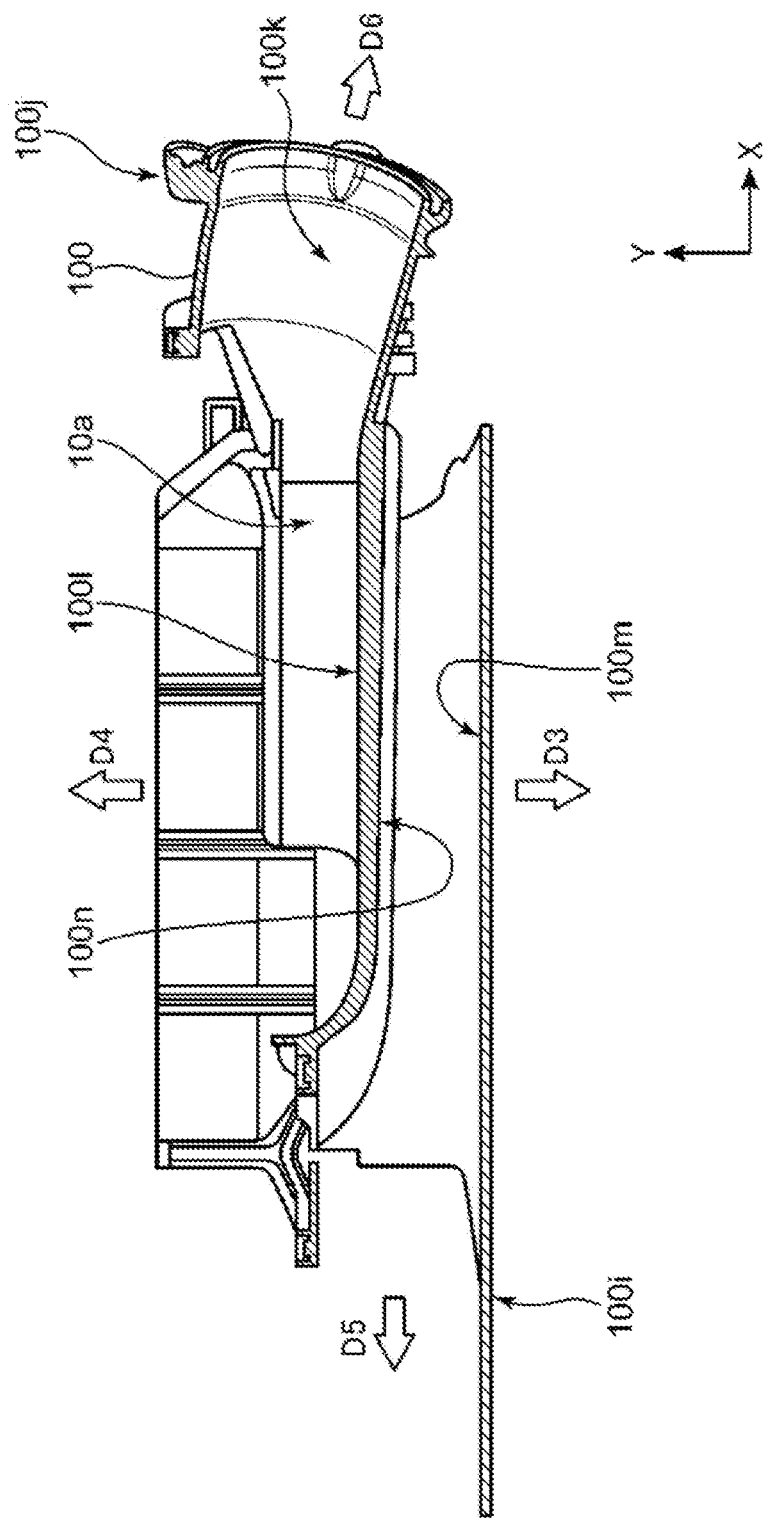
FIG. 8 is a cross-sectional view illustrating a configuration of a cross section taken along a line VIII-VIII of FIG. 7.

As illustrated in FIG. 7, in this embodiment, the center member 100 is formed using at least six divided molds. In detail, two molds are disposed so as to oppose to each other in the thickness direction with a space for forming the wall part 100i therebetween, and two molds for closing above and below in the Z-direction of the two molds, and two molds for closing both sides in the X-direction are used.

Upon the production of the center member 100, the die-cutting directions after the resin is filled and the resin solidifies are directions illustrated by arrows D1-D6. Among them, the die-cutting direction illustrated by the arrow D6 is set as an oblique direction slightly inclined with respect to the X-direction in order to form the introducing pipe wall part 100j which surrounds the opening 100, because the opening 100k in the part on one end side of the intake air introducing pipe 10 has an angle to the X-direction.

When forming the center member 100, in order to adopt a molding method in which the die-cutting directions D1-D6 of the molds are set as described above, as illustrated in FIG. 8, a wall part 100l which constitutes a part of the intake air introducing pipe 10a and a part of the surge tank 10b, and the wall part 100i in which the outside cover member 101 and the inside cover member 103 are joined are provided so that mutually-opposite surfaces 100*m* and 100*n* are parallel to each other, or spread gradually to the left side in the X-direction (die-cutting direction D5). Therefore, the molds can be opened smoothly, and the production of the center member 100 becomes easier.

Note that since the die-cutting direction D6 is an oblique direction with an angle to the X-direction, the opposite surfaces 100*m* and 100*n* of the wall parts 100*i* and 100*l* are formed by the molds which are opened in the direction D5.

7. Effects

In the intake system 1 according to this embodiment, while the first independent intake pipe 10*c* is formed by joining the center member 100 to the outside cover member 101, the second to fourth independent intake pipes 10*d*-10*f* are formed by joining the inside cover member 103 to the outside cover member 101. Thus, the part which forms the arc shape of the second to fourth independent intake pipes 10*d*-10*f* can be formed so that it is separated from the intake air introducing pipe 10*a* and the surge tank 10*b* more than the first independent intake pipe 10*c* is, without increasing the thickness of the part of the wall part 100*i* of the center member 100 corresponding to the second to fourth independent intake pipes 10*d*-10*f*. Therefore, by making the first independent intake pipe 10*c* be curved in the X-direction, and disposing the arc shape of the second to fourth independent intake pipes 10*d*-10*f* so as to be separated greatly from the intake air introducing pipe 10*a* and the surge tank 10*b*, it can suppress the deformation, such as warping, during production of the center member 100, while having the same pipe length as the first independent intake pipe 10*c*.

Further, in the intake system 1 according to this embodiment, since the wall parts 100*i* and 100*l* of the center member 100 which constitute the intake manifold 10 are formed so that the opposite surfaces are parallel to each other, or a separation between the wall surfaces 100*m* and 100*n* may be increased in the die-cutting direction D5, the molds for constituting the opposite surfaces 100*m* and 100*n* can be opened in the die-cutting direction D5, when producing the center member 100 using the divided molds. Therefore, in the intake system 1, the center member 100 which is one of the members 100-103 which constitute the intake manifold 10 can be formed appropriately.

Further, in the intake system 1 according to this embodiment, by curving the first independent intake pipe 10*c* of the intake manifold 10 in the X-direction, it is possible to reduce the useless space inside the engine bay, while keeping the first independent intake pipe 10*c* from interfering with the ISG 30 which is disposed in proximity to the first independent intake pipe 10*c*. Further, in the intake system 1, variation in the passage resistance of fresh air toward the intake port of the engine 20 can be suppressed by avoiding the interference with the ISG 30, and the pipe lengths of the first independent intake pipe 10*c* and the second to fourth independent intake pipes 10*d*-10*f* can be equalized.

Further, in the intake system 1 according to this embodiment, since the intake air introducing pipe 10*a* and the surge tank 10*b* can be formed by joining the center member 100 to the base member 102, it can reduce the number of members which constitute the intake manifold 10.

Further, in the intake system 1 according to this embodiment, since each of the members 100-103 which constitute the intake manifold 10 is made of resin, the production is easier than in the case where it is made of metal, and therefore, it can suppress the increase in the weight. Further, as described above, since a part of the peripheral wall of the second to fourth independent intake pipes 10*d*-10*f* is configured using the inside cover member 103 which is different from the center member 100, it can suppress the deformation, such as a warp, when manufacturing the center member 100, and therefore, it can be manufactured easily.

Further, in the intake system 1 according to this embodiment, since the second to fourth independent intake pipes 10*d*-10*f* among the first to fourth independent intake pipes 10*c*-10*f* have the peripheral wall formed by joining the center member 100 to the inside cover member 103, and the inside cover member 103 is formed integrally over the second to fourth independent intake pipes 10*d*-10*f*, it can suppress the increases in the number of members constituting the intake manifold 10, and the management and the handling of the inside cover member 103 become easier.

As described above, in the intake system 1 according to this embodiment, as for the intake manifold 10, by forming it by joining the plurality of members 100-103, the production is easier, and even when the layout in which the first independent intake pipe 10*c* is curved in the X-direction is adopted, it is possible to equalize the pipe lengths of the first to fourth independent intake pipes 10*c*-10*f*.

MODIFICATION(S)

Although in the above embodiment the four-cylinder engine 20 is adopted as one example of the engine, the present disclosure may also adopt an engine with three, or five or more cylinders.

Although in the above embodiment the ISG 30 is adopted as one example of "another component," it is also possible in the present disclosure to dispose various components, such as an A/C compressor, a starter motor, and an alternator (a generator which does not have the function of a vehicle propelling source), at this position.

Although in the above embodiment the members 100-103 which constitute the intake manifold 10 are made of resin, some or all of the members may be made of material other than resin (for example, metal) in the present disclosure.

Although, in the above embodiment, as for the inside cover member 103, the entire configuration is integrally formed by connecting the second inside cover part 103*a* with the third inside cover part 103*b* through the connecting part 103*d*, and connecting the third inside cover part 103*b* with the fourth inside cover part 103*c* through the connecting part 103*e*, it is also possible to adopt in the present disclosure a configuration in which a plurality of inside cover parts are not connected.

Although in the above embodiment the first independent intake pipe 10*c* is curved more than the other independent intake pipes 10*d*-10*f*, when the intake manifold 10 is seen from the front in the Y-direction, the independent intake pipe located at an end opposite from the first independent intake pipe in the X-direction may be curved more than the other independent intake pipes in the present disclosure.

Although in the above embodiment the intake manifold 10 has the surge tank 10*b*, it is also possible in the present disclosure to adopt an intake manifold without the surge tank 10*b*. In this case, a plurality of independent intake pipes may be joined to the intake air introducing pipe.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Intake System
10 Intake Manifold
10a Intake Air Introducing Pipe
10b Surge Tank
10c-10f Independent Intake Pipe
10g Space
20 Engine
30 ISG (Another Component)
100 Center Member (First Member)
101 Outside Cover Member (Second Member)
102 Base Member (Fourth Member)
103 Inside Cover Member (Third Member)

What is claimed is:

1. An intake system of an engine, comprising:
an intake manifold, attached to a cylinder head of the engine and formed by joining a plurality of members, the intake manifold including:
an intake air introducing pipe having a tubular passage and configured to introduce fresh air; and
a plurality of independent intake pipes, each having a tubular passage, attached to the cylinder head of the engine and configured to guide the fresh air to respective intake ports formed in the cylinder head,
wherein the intake air introducing pipe is formed so as to extend in a cylinder lined-up direction of the engine,
wherein each of the plurality of independent intake pipes is formed in an arc shape so as to surround the intake air introducing pipe from outside, with a space from a peripheral surface of the intake air introducing pipe opposite from the engine,
wherein, when the intake manifold is seen from the front in an intake-and-exhaust direction of the engine, among the plurality of independent intake pipes, a first independent intake pipe located at one end in the cylinder lined-up direction is curved more in the cylinder lined-up direction than a second independent intake pipe different from the first independent intake pipe,
wherein, when the intake manifold is seen from the side in the cylinder lined-up direction, the arc shape of the second independent intake pipe is more distant from the intake air introducing pipe than the first independent intake pipe is, and
wherein the plurality of members constituting the intake manifold includes:
a first member constituting a part of a peripheral wall of the intake air introducing pipe;
a second member joined to the first member radially outward of the intake air introducing pipe, wherein joining of the first and second members forms the arc shape of the first independent intake pipe; and
a third member disposed radially outward, with reference to the intake air introducing pipe, of the first member with a gap therebetween, wherein joining of the second and third members forms the arc shape of the second independent intake pipe.

2. The intake system of claim 1,
wherein the intake air introducing pipe has an opening at one-end side in the cylinder lined-up direction, configured to take in fresh air,
wherein the first independent intake pipe is, among the plurality of independent intake pipes, disposed opposite in the cylinder lined-up direction from the side where the opening of the intake air introducing pipe is formed,
wherein the first member has a first wall part constituting part of the intake air introducing pipe, and a second wall part, constituting part of the first independent intake pipe, and located on an intake air introducing pipe side with respect to the third member, and
wherein the first wall part and the second wall part are formed so that mutually-opposite wall surfaces are parallel to each other, or so that a separation between the mutually-opposite wall surfaces increases from the one-end side toward the opposite side in the cylinder lined-up direction.

3. The intake system of claim 2,
wherein the first independent intake pipe is curved so that a lower part of the engine in a cylinder axis direction is located further toward the one-end side in the cylinder lined-up direction than an upper part is, and
wherein another component different from the intake manifold is disposed in a part adjacent to the first independent intake pipe on the opposite side in the cylinder lined-up direction so that a part thereof is located inside the curve of the first independent intake pipe.

4. The intake system of claim 3,
wherein the intake manifold further includes a surge tank to which the intake air introducing pipe and the plurality of independent intake pipes are joined, the plurality of members constituting the intake manifold further including:
a fourth member, joined to the first member from the engine side, wherein joining of the fourth member and the first member forms the surge tank and the intake air introducing pipe.

5. The intake system of claim 4, wherein the first member, the second member, the third member, and the fourth member are each made of resin.

6. The intake system of claim 5,
wherein the remaining independent intake pipes among the plurality of independent intake pipes other than the first independent intake pipe each form the respective arc shape by joining the first member to the third member, and
wherein the third member is formed integrally over all the remaining independent intake pipes.

7. The intake system of claim 3,
wherein the remaining independent intake pipes among the plurality of independent intake pipes other than the first independent intake pipe each form the respective arc shape by joining the first member to the third member, and
wherein the third member is formed integrally over all the remaining independent intake pipes.

8. The intake system of claim 4,
wherein the remaining independent intake pipes among the plurality of independent intake pipes other than the first independent intake pipe each form the respective arc shape by joining the first member to the third member, and
wherein the third member is formed integrally over all the remaining independent intake pipes.

9. The intake system of claim 2,
wherein the intake manifold further includes a surge tank to which the intake air introducing pipe and the plurality of independent intake pipes are joined, the plurality of members constituting the intake manifold further including:

a fourth member, joined to the first member from the engine side, wherein joining of the fourth member and the first member forms the surge tank and the intake air introducing pipe.

10. The intake system of claim 2,
wherein the remaining independent intake pipes among the plurality of independent intake pipes other than the first independent intake pipe each form the respective arc shape by joining the first member to the third member, and
wherein the third member is formed integrally over all the remaining independent intake pipes.

11. The intake system of claim 1,
wherein the intake manifold further includes a surge tank to which the intake air introducing pipe and the plurality of independent intake pipes are joined, the plurality of members constituting the intake manifold further including:
a fourth member, joined to the first member from the engine side, wherein joining of the fourth member and the first member forms the surge tank and the intake air introducing pipe.

12. The intake system of claim 11, wherein the first member, the second member, the third member, and the fourth member are each made of resin.

13. The intake system of claim 11,
wherein the remaining independent intake pipes among the plurality of independent intake pipes other than the first independent intake pipe each form the respective arc shape by joining the first member to the third member, and
wherein the third member is formed integrally over all the remaining independent intake pipes.

14. The intake system of claim 12,
wherein the remaining independent intake pipes among the plurality of independent intake pipes other than the first independent intake pipe each form the respective arc shape by joining the first member to the third member, and
wherein the third member is formed integrally over all the remaining independent intake pipes.

15. The intake system of claim 1,
wherein the remaining independent intake pipes among the plurality of independent intake pipes other than the first independent intake pipe, each form the respective arc shape by joining the first member to the third member, and
wherein the third member is formed integrally over all the remaining independent intake pipes.

* * * * *